United States Patent [19]  
Kurtz et al.

[11] 3,739,315  
[45] June 12, 1973

[54] SEMICONDUCTOR TRANSDUCERS HAVING H SHAPED CROSS-SECTIONAL CONFIGURATIONS

[75] Inventors: Anthony D. Kurtz, Englewood; Joseph Mallon, Wood Ridge; Charles Gravel, River Edge, all of N.J.

[73] Assignee: Kulite Semiconductors Products, Inc., Ridgefield, N.J.

[22] Filed: May 18, 1972

[21] Appl. No.: 254,642

[52] U.S. Cl. .................. 338/3, 73/88.5 SD, 338/4, 338/5
[51] Int. Cl. .................................................. G01l 1/22
[58] Field of Search ................................. 338/2-5; 73/88.5 SD, 388 R, 398 AR; 324/65 R

[56] References Cited
UNITED STATES PATENTS
3,139,598 6/1964 Ruge .......................... 73/88.5 R X
3,654,579 4/1972 Kurtz ................................... 338/2
3,213,681 10/1965 Pearson .............................. 338/4 X

*Primary Examiner*—C. L. Albritton
*Attorney*—Arthur L. Plevy

[57] ABSTRACT

There is disclosed a piezoresistive transducer assembly having a thin force collecting diaphragm interposed between two annular rims to afford a H shaped cross-sectional configuration to the assembly for providing mechanical stability and temperature compensation.

4 Claims, 3 Drawing Figures

PATENTED JUN 12 1973 3,739,315
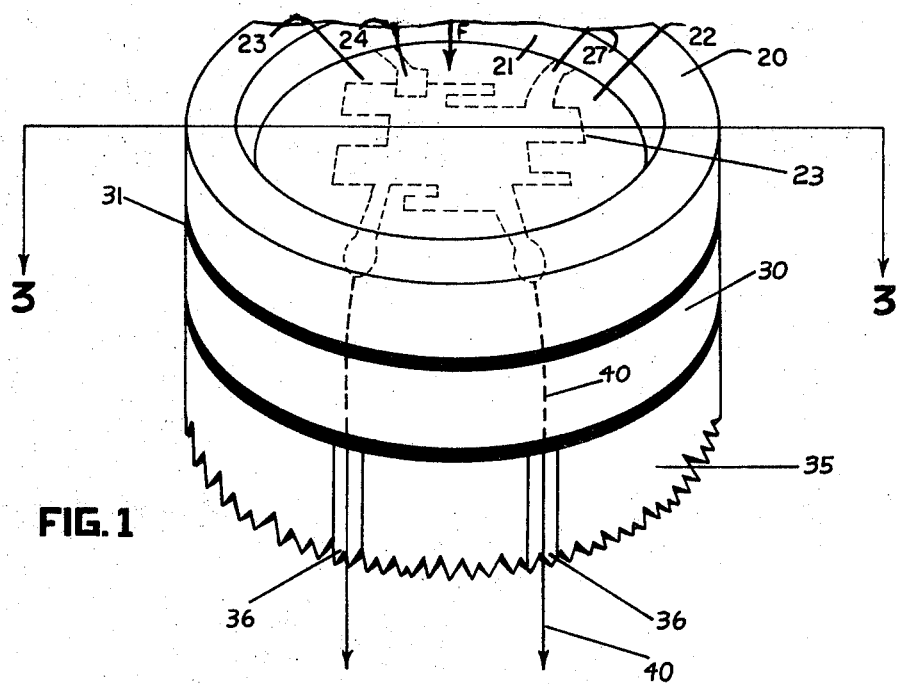
FIG.1
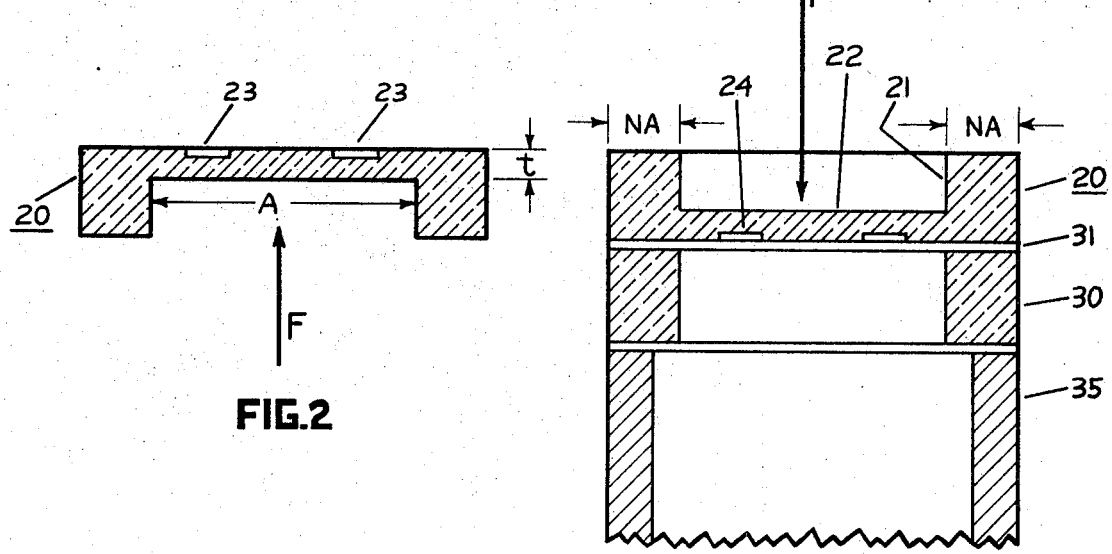
FIG.2
FIG.3

SEMICONDUCTOR TRANSDUCERS HAVING H SHAPED CROSS-SECTIONAL CONFIGURATIONS

BACKGROUND OF INVENTION

This invention relates to electromechanical transducers and more particularly to such transducers fabricated from semiconductor materials and employing piezoresistive semiconductors as force sensing elements.

The use of the piezoresistive effect in semiconductors has enabled the construction of a wide variety of semiconductor transducers for use as strain gauges, pressure sensors and in other applications as well.

Of equal importance in using semiconductor techniques in the fabrication of such transducers is the decrease in size and the overall increase in operating efficiency and reliability.

During the past few years the extensive research and development done in the transducer field has provided a device commonly referred to as an ultraminiature pressure transducer. Such transducers may typically have deflecting diaphragms on the order of 0.108 inch with effective active areas of 0.90 inches. The thickness of such diaphragms may be on the order of 0.001 inch to 0.010 inches.

The use of small integral diaphragms of silicon as force collectors for the piezoresistive elements permits the construction of pressure transducers with high natural frequencies, enabling accurate monitoring of high frequency pressures. Silicon has a very high stiffness to density ratio, with a modulus essentially equal to that of steel and a density comparable to aluminum. This factor coupled with high piezoresistive coefficients and marked size reduction possible with microcircuitry techniques significantly seem to increase the natural frequency of the diaphragm.

It can be shown that this frequency is directly proportional to the thickness of the diaphragm and inversely proportional to the square of the clamped radius.

Basically, it is the factor of thickness divided by the square of the clamped radius that determines this frequency. As one contemplates various new uses of such transducers, as implants in the body to measure internal pressure of blood or organs and so on, one realizes that the size of such diaphragms and transducers will be smaller and smaller.

This presents a number of new problems in using and operating such ultraminiature transducers. First, mechanical stability of the transducer becomes a problem. That is as the unit becomes smaller, one experiences greater difficulty in fabricating the same. For example the silicon diaphragm has to be processed by monolithic or other techniques so it can accommodate the piezoresistive transducers. During such processing it has to firmly and easily mount and be held in place. Furthermore, after fabrication it has to be secured to a housing or other means so it can be conveniently placed in a pressure sensitive environment. Coupled with these problems are temperature problems. For example, prior art devices employed integral silicon diaphragms mounted on metallic or other housings. At elevated temperatures the different coefficients of expansion between the dissimilar materials served to flex the diaphragm resulting in erroneous pressure readings and so on.

It is therefore an object of this invention to provide an improved transducer having good mechanical stability as well as improved operation at elevated temperatures.

BRIEF DESCRIPTION OF PREFERRED EMBODIMENT

There is provided an electromechanical transducer assembly cmprising a thin force collecting diaphragm integrally formed with a thickner rim portion about the outside periphery thereof, an annular ring is secured to the surface of said diaphragm opposite said rim, to provide another rim about the periphery of said opposite surface, at least one force responsive element is positioned on this opposite surface and is surrounded by said annular ring, said transducer assembly thus having an H shaped cross-sectional configuration for providing mechanical stability and temperature compensation.

BRIEF DESCRIPTION OF FIGURES

FIG. 1 shows a plan view of an improved pressure transducer according to this invention.

FIG. 2 is a cross-sectional view of the cup-shaped diaphragm and transducing portion of the transducer of FIG. 1.

FIG. 3 is a cross-sectional view taken through line 3—3 of FIG. 1.

DETAILED DESCRIPTION OF FIGURES

Referring to FIG. 1 there is shown a cup shaped member 20 fabricated from silicon. The member 20 is fabricated from mono-crystalline silicon and has a rim portion 21 surrounding an active diaphragm or force collector 22.

The active portion 22 of the member 20 has located on the bottom surface thereof a number of piezoresistive elements 23 further arranged in a wheatstone bridge configuration. The piezoresistive elements may be atomically bonded onto the active area of the diaphragm by means of conventional semiconductor tehniques such as solid state diffusion techniques, epitaxial growth techniques and so on. Each arm of the bridge is coupled to a contact area 24 which is directed towards the rim portion 21 of the member 20.

As indicated, member 20 is basically a cup shaped configuration and although shown as cylindrical it can assume other geometrical formats as well. Basically, the member is fabricated from a disc or slab of silicon. The active diaphragm area is etched out to a desired thickness and shape by means of an acid etchant operative in combination with a masking technique. This assures that the thickness of the diaphragm ($t$ of FIG. 2) can be accurately controlled and that the effective diameter of the active area can be effectively controlled ($A$ of FIG. 2).

The rim serves as a convenient clamping point to securely hold the diaphragm during the process, imparting great mechanical stability. Normally after the active diaphragm area 22 is formed the piezoresistive elements 23 are deposited or otherwise located within this area. The rim 21 serving to enable easy grasping, positioning and retention of the member 20 during any such process, including deposition of the metallized terminal or contact areas 24.

As one can readily ascertain from FIG. 2, the piezoresistive elements 23 are located on the top side of the member 20. FIG. 2 shows member 20 in cross-section and it possesses an inverted U shaped cross section.

Briefly, the member 20 after processing is a transducer, as it has located thereon piezoresistive elements 23, terminal areas 24, an active diaphragm portion or force collector 22. Accordingly, one could mount this directly to a suitable housing, run leads and measure pressure and other forces.

However, it is desired to mount the diaphragm with the elements 23 facing away from the forces (F) directed thereat. The reasons are to first prevent contamination of the piezoresistive elements by chemicals or astringents in the force atmosphere, and to further protect leads and contact areas from corrosive elements. In mounting only assembly 20 to a housing of metal or ceramic, one could easily fracture the thin diaphragm portion 22. Furthermore, the temperature problem resulting from different coefficients of expansion between the housing and assembly 20 has not been alleviated.

In ths manner FIG. 1 shows an annular support ring 30, also fabricated from silicon. The support ring 30 may have an effective height approximately equal to the height of the rim 21 of member 20.

The support ring 30 is bonded to the outside periphery of the member 20 at the piezoresistive element accommodating surface.

The bond 31 may be provided by a number of techniques as by using an epoxy, a glass bond or an electrostatic bond.

The annular ring 30 since it is fabricated from silicon, has the same expansion coefficient as does the member 20. It further serves to isolate the diaphragm from the metal or ceramic housing 35, as the annular ring 30 is bonded to the housing 35 by means of a suitable bonding technique as those described.

The housing may have slots or wire accommodating apertures 36 in the side surfaces thereof.

Appropriate leads 40 are directed through holes between the ring 30 and housing 35 and are routed within the slots 36. For examples of such lead configurations reference is made to U.S. Pat. No. 3,654,579 issued April 4, 1972 and entitled "Electromechanical Transducers and Housing" by Anthony D. Kurtz, Joseph Mallon and Charles Gravel and assigned to the same assignee as herein.

Referring to FIG. 3 there is shown a cross-section taken through line 3—3 of FIG. 1.

As one can readily see the composite assembly of member 20 and ring 30 possesses an H shaped cross-section. The thin force collecting diaphragm 22 is positioned as the center arm of the H while the rim portion 21 and the sides of the ring 30 form the arms of the H.

The configuration affords good mechanical stability as the composite structure has great additional strength and can be conveniently handled and therefore easily mounted to the housing 35 as shown. The further advantages are that the effective non-active area of the diaphragm (NA), which area will not appreciably deflect upon application of the force F, to the assembly, is balanced in regard to mass. Due to the fact that the member 20 and ring 30 are both fabricated from the same type of semiconductor material, their temperature coefficients are the same, resulting in a balanced response to temperature charges. Thus relatively avoiding undesirable changes in transducer characteristics with temperature change; as the active diaphragm area is again isolated from the housing by means of the ring 30.

While the foregoing description and specification sets forth the principles of the invention in connection with specific apparatus, it is to be understood that the description is made only by way of example and not as a limitation of the scope of the invention as set forth in the accompanying claims.

We claim:

1. An electromechanical transducer for responding to the magnitude of an applied force comprising,
   a. a first annular shaped member fabricated from an integral piece of silicon and having a central hollow and a closed bottom surface, said bottom surface being relatively thin and surrounded by a thicker side surface, said member having a U shaped cross-section, said bottom surface defining a force collecting diaphragm and having deposited thereon at least one piezoresistive element, said element being deposited on the side of said bottom surface not surrounded by said thicker side surface but within the area defined by said central hollow,
   b. a annular ring fabricated from silicon and having a continuous central aperture approximately congruent with said bottom surface of said first member as enclosed by said thicker side surface,
   c. means for coupling said second annular ring to said first member with the thickness of said sides of said second annular ring underlying the side of said first annular member, to form an H shaped cross-sectional composite member, with said force collector diaphragm positioned as the center arm of said H, and said piezoresistive element surrounded by said second annular ring.

2. An electromechanical transducer comprising,
   a. a cup shaped member fabricated from an integral piece of silicon and having a thin bottom area, defining a force collecting diaphragm and having located on said bottom surface at least one piezoresistive element, said cup member having a continuous thicker side section surrounding the bottom surface opposite to that portion containing said element,
   b. an annular ring having a central continuous aperture of a diameter approximately equal to the diameter of said bottom area, said ring fabricated from the same material as said cup and secured thereto, to surround said piezoresistive element, thereby forming a composite transducer having an H shaped cross-section.

3. The transducer assembly according to claim 2 further comprising,
   a. a longitudinal tubular housing member having at least one wire accommodating slot in a side surface thereof,
   b. means for coupling said annular ring to the top of said housing member with said central aperture communicating with the aperture of said tubular member.

4. The apparatus according to claim 3, further including,
   a. at least one conductor coupled to said force responsive element and directed from said bottom surface and located within said wire accommodating slot in said housing.

* * * * *